Sept. 3, 1963
W. J. TOMLIN
3,102,565
SCREW DRIVERS
Filed Jan. 27, 1960
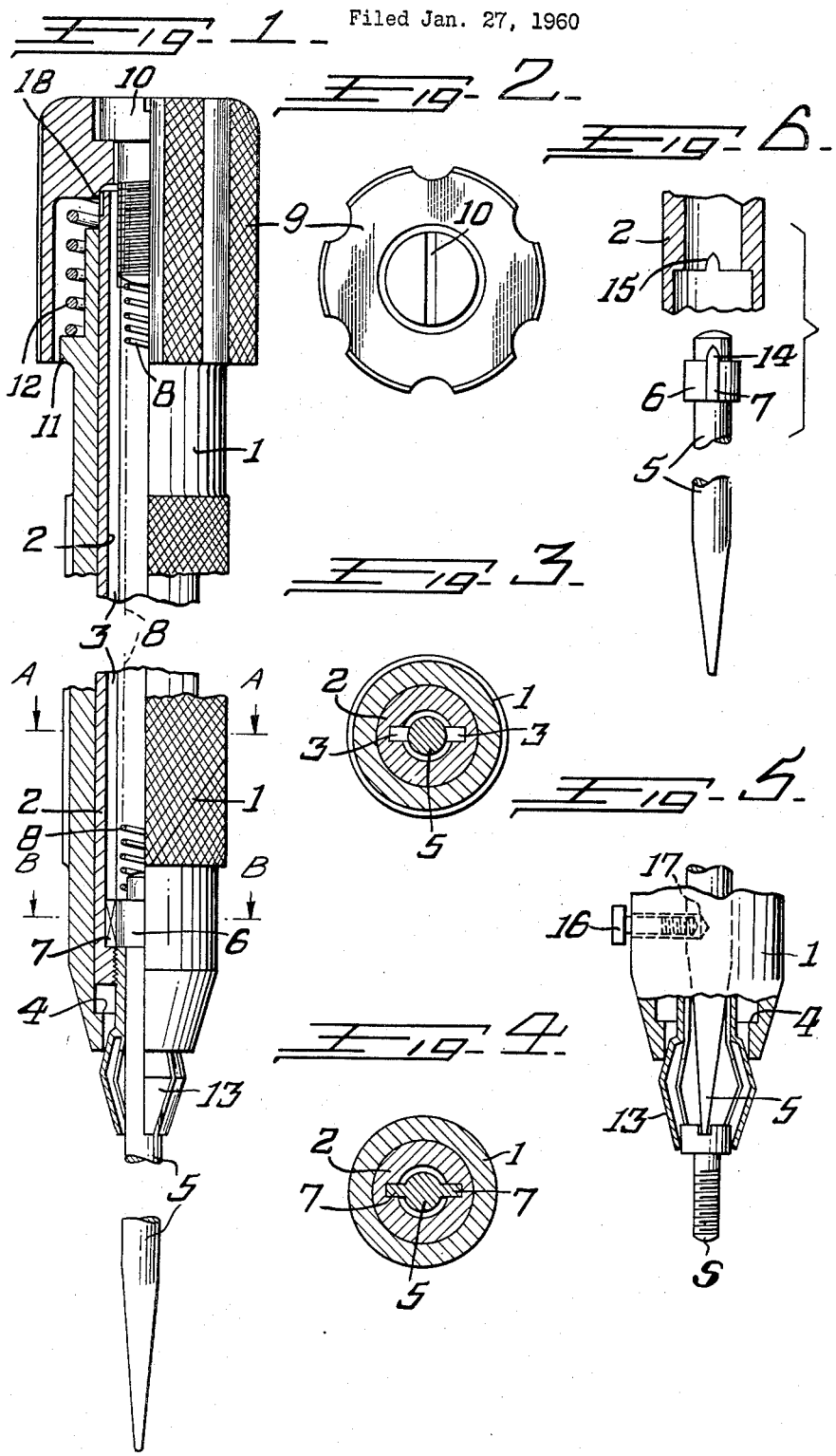

United States Patent Office 3,102,565
Patented Sept. 3, 1963

3,102,565
SCREW DRIVERS
William James Tomlin, 15 Howden Place,
Leeds 6, England
Filed Jan. 27, 1960, Ser. No. 5,016
2 Claims. (Cl. 145—52)

The invention relates to screw-drivers and has for its object to provide a new or improved construction thereof in which there is incorporated means for engaging with and gripping the heads of screws for facilitating their insertion and withdrawal, further means being also provided for automatically ejecting screws from the said gripping means when necessary.

According to the invention the screw-driver includes a handle or casing housing an axially movable spring-retracted member furnished with a head or thimble and adapted to carry a chuck or other suitable gripping device and an axially slidable spring-loaded screw-driver shaft in a manner whereby the shaft may be retracted and retained within the aforesaid member and handle but upon pressure being applied to the thimble and member the said shaft is automatically protracted from the handle.

In order that the invention may be fully and clearly comprehended the same will now be described with reference to the accompanying drawings, in which:

FIGURE 1 is a fragmental elevation—partly in axial section—of a screw-driver constructed according to one embodiment of the invention, wherein is depicted the screw-driver shaft or shank in a protracted position relative to the handle.

FIGURE 2 is a plan of FIGURE 1.

FIGURE 3 is a cross-section on the line A—A of FIGURE 1, with spring omitted.

FIGURE 4 is a similar view to FIGURE 3 on the line B—B of FIGURE 1.

FIGURE 5 is a partly sectional elevation of the nose end of the handle of the screw-driver illustrated in FIGURE 1, wherein is depicted the screw-driver shaft in a retracted position with a screw gripped by associated means—also shown is locking means for the shaft.

FIGURE 6 is a fragmental elevation—partly in axial section—of a modified screw-driver shaft and associated sleeve.

Similar reference numerals refer to similar parts through-out the several views.

Referring to FIGURES 1-5 the screw-driver comprises a handle or casing 1 of any convenient cross-sectional shape and size in which there is provided a two-diameter axial bore, the smaller bore being of comparatively short length located at the outer end or nose of the handle.

Snugly and slidably housed in the larger of the aforesaid two diameter bore is a tubular sleeve 2 both ends of which are internally screw-threaded and whose interior is provided with a pair of longitudinal slots, splines, or keyways 3. The chuck 13 projects slightly from one end of the handle 1 and movement of the sleeve in an outward direction is limited by an internal shoulder 4 formed by the intersection of the two diameter bores.

Located within the axial bore of the sleeve 2 by insertion from the inner end of the latter is a screw-driver shank or shaft 5 secured to or formed integral with which is a boss 6 furnished with a pair of keys 7 adapted to mesh with the aforesaid keyways 3 of the sleeve.

Also located in the bore of the sleeve 2 is a helical spring 8 of a soft or very resilient nature one end of which engages the boss 6 of the shaft 5. The opposite end of the spring 8 engages with a dished thimble or cap 9 secured to the end of the sleeve 2 by a screw 10. Any suitable means are associated with the co-acting ends of the sleeve and thimble for preventing rotation of one part relative to the other. For instance the end of the sleeve may have a flat or flats 18 thereon fitting with a correspondingly shaped part of the thimble. Or the said parts may be pegged or otherwise secured together.

Interposed between the thimble 9 and a shoulder or annular flange 11 on the handle 1 is a fairly strong helical spring 12, the shape of the thimble being adapted to conceal the said spring.

Screwing into the outer end of the sleeve 2 is a chuck or collet 13 provided with a frusto-conical end and an appropriately shaped bore. In other words, the bore may be either tapered or stepped, for accommodating screw-heads of different sizes within a certain range.

Pressure upon the thimble end of the screw-driver when the shaft 5 is held stationary causes the shaft to automatically retract into the sleeve 2 and handle 1, the keys 7 on the shaft sliding longitudinally within the ways 3 of the sleeve.

When the blade has been retracted, pressure of the spring 12 on the flange 11 which draws the frusto-conical inner end of the chuck 13 partly into the small diameter bore of the handle, causes the chuck to grip and hold the shaft 5 with the end of the sleeve 2 clear of the shoulder 4.

The head of a screw S may be pressed into the jaws of the chuck 13 as clearly shown in FIGURE 5 for the jaws to grip and hold the said screw. The latter may then be inserted into a work-piece where desired and screwed home.

To remove a screw from a secured position, the tapered end of the protracted screw-driver shaft 5 is inserted into the customary saw-cut of the screw (see FIGURE 5) and the handle pressed in the manner already described to retract the shaft and enable the jaws of the chuck 13 to grip the screw-head, whereupon the screw-driver is rotated to unscrew the screw. When the latter is freed from a workpiece or the like it is firmly held by the chuck and cannot be accidentally lost or dropped into adjacent mechanism or the like. By pressing the thimble 9 inward relative to the handle 1 and against the pressure of the spring 12 the member 2 moves and the chuck partially clears the handle end so that the chuck relinquishes its grip upon the shaft 5 and the spring 8 then automatically ejects the shaft from the chuck by pressure upon the boss 6.

From the preceding description it will be clearly apprehended that the screw-driver may be employed for screwing or unscrewing operations whatever the position of the blade 5 relative to the handle 1, but that undue pressure upon the tool may cause the blade to accidentally retract if the amount of pressure applied is sufficient to overcome the grip of the chuck 13, on the shaft. For use by watchmakers and others such a construction is satisfactory.

To eliminate the possibility of accidental retraction of the shaft as stated and to enable the screw-driver to cope with heavier work means may be incorporated in the screw-driver for positively locking the shaft in its fully protracted state. FIGURE 6 of the drawings illustrates a simple method of effecting a positive lock and consists in providing a pair of snugs or projections 14 on one end of the boss 6 and a corresponding pair of depressions 15 on the end of the sleeve 2. By terminating the keyways of the sleeve somewhat short of the chuck or nose end thereof, space is allowed for enabling the protracted shaft 5 to be partly rotated and moved back for the snugs 14 to engage or mesh with the depressions 15 and lock the shaft.

Any other convenient method may be employed for locking the screw-driver shaft against retraction. In another example, (see FIGURE 5) a radially movable pin 16 on the handle may be pressed inward to engage a radial bore 17 in the shaft 5, or a number of aligned bores may be provided in the shaft for locking the latter in any one of several positions. Also, the cross-sectional shape of the shaft 5 may be other than circular for use with a correspondingly shaped member 2.

The end of the screw-driver shaft may be of conventional shape as illustrated in the drawings or it may be hexagonal, star-shaped or otherwise designed according to the nature of the screws for which it is intended to be employed.

I claim:

1. A screw driver comprising a two-diameter axially bored handle housing, an axially movable tubular sleeve slidably and snugly mounted with said handle housing, both ends of said sleeve being internally screw threaded, said sleeve being provided on its interior surface between the screw threaded end portions with a pair of longitudinal slots, an internal shoulder in said handle housing formed by the intersection of the two-diameter bores thereof to limit movement of said sleeve in an outward direction from said handle, a chuck screwed into the bottom end of said sleeve, a screw driver shank fitted within the bore of said chuck and in said sleeve, said chuck having a frusto-conical end and a tapered bore to secure screws of different sizes in alignment with said screw driver shank within the bore of said chuck, a boss and keys formed on said shank adjacent the upper end of said shank which fit into said internal longitudinal slots of the sleeve to thereby secure said shank, permit sliding retracting movement of said shank in said sleeve and to limit the rotation of said shank relative to said sleeve, a closure cap over said sleeve and handle, a helical soft spring, a screw member at the upper end of said sleeve for securing said closure cap and for limiting said soft spring at the upper end of said sleeve, said soft spring engaging at its bottom end said boss of the shank and engaging at its top end a screw member, said cap and said sleeve being provided with locking means to prevent relative rotation, an annular flange at the end of said handle below said closure cap, a second spring stronger than said soft spring mounted between said closure cap and said annular flange in bearing relation against the sides of said chuck to cause said chuck to grip said shank tightly when the spring is depressed while said soft spring ejects the shank from the chuck by pressure exerted upon said boss with the keys of said shank movable in said slot, the outer surface of said chuck being in frictional engagement with the bottom of said handle to prevent accidental retraction of said shank.

2. A screw driver as claimed in claim 1 wherein said locking means preventing rotation of said cap relative to said sleeve consists of projections on the upper part of said sleeve and notches on the inner surface of said cap, said projections of said sleeve fitting into the notches of said cap to resist relative rotation.

References Cited in the file of this patent

UNITED STATES PATENTS

| 1,441,950 | Simon | Jan. 9, 1923 |
| 1,705,205 | Reams | Mar. 12, 1929 |
| 2,632,489 | Johnson | Mar. 24, 1953 |

FOREIGN PATENTS

| 171,101 | Switzerland | Nov. 16, 1934 |